US006562738B1

(12) United States Patent
Hrazdil

(10) Patent No.: US 6,562,738 B1
(45) Date of Patent: May 13, 2003

(54) APPARATUS FOR HIDING A DOOR KEY

(76) Inventor: Wesley R. Hrazdil, 10051 Westpark Dr., #230, Houston, TX (US) 77042

(*) Notice: Subject to any disclaimer, the term of this patent is extended or adjusted under 35 U.S.C. 154(b) by 279 days.

(21) Appl. No.: 09/704,985

(22) Filed: Nov. 2, 2000

Related U.S. Application Data

(60) Provisional application No. 60/172,870, filed on Nov. 20, 1999.

(51) Int. Cl.[7] .......................... B32B 9/00; A45L 11/32

(52) U.S. Cl. ...................... 442/59; 206/37.1; 206/37.4; 206/38.1; 206/39.1; 224/400; 15/215; 15/216; 15/217; 428/85; 52/181; 52/660

(58) Field of Search .............................. 206/37.1, 37.4, 206/38.1, 39.1; 224/400; 15/215, 216, 217; 52/181, 660; 428/85

(56) References Cited

U.S. PATENT DOCUMENTS

| | | | | |
|---|---|---|---|---|
| 3,390,414 A | | 7/1968 | Kravitt | 15/217 |
| 3,886,620 A | | 6/1975 | Miller et al. | 15/217 |
| 4,201,817 A | * | 5/1980 | Duncan, Jr. | 428/141 |
| 5,215,348 A | * | 6/1993 | Wen-Hwang | 296/97.23 |
| 5,293,660 A | | 3/1994 | Park | 15/160 |
| 5,316,817 A | * | 5/1994 | Timperley | 428/78 |
| 5,919,540 A | | 7/1999 | Bailey | 428/67 |

* cited by examiner

*Primary Examiner*—Terrel Morris
*Assistant Examiner*—Alexis Wachtel
(74) *Attorney, Agent, or Firm*—Jackie Lee Duke

(57) ABSTRACT

An apparatus for hiding a door key including a door mat formed of either a plastic material or braided material such as hemp is disclosed. The door mat is rectangularly shaped with raised portions formed on the top surface. Different embodiments are shown with these raised portions forming a decorative border, an esthetically pleasing pattern or a greeting, such as "WELCOME", as is commonly seen. A hidden compartment sized to receive a typical house key is formed in these raised portions that is accessible through a hook and loop type closure. When the hook and loop type closure is closed, the compartment and its contents remain hidden from view.

10 Claims, 3 Drawing Sheets

APPARATUS FOR HIDING A DOOR KEY

This application claims the benefit of U.S. Provisional Application No. 60/172,870, filed Nov. 20, 1999.

BACKGROUND OF THE INVENTION

1. Field of the Invention

The present invention relates to devices with hidden compartments and more particularly to a door or welcome mat having a number of raised sections. These raised sections may form a decorative border or letters spelling out the word "WELCOME" or similar greeting wherein one the letters is provided with a Velcro closure that is opened to reveal a hidden compartment within which a key to a door may be secured.

Many individuals find that hiding a key to the house can be beneficial to allow relatives, children and other individuals to enter the house without requiring of a parent or adult to go home and let the individual into the home. Although it is a good idea to have a hidden key, it is often difficult to find a location where the key can be safely hidden. It would be a benefit, therefore, to have a door mat that included a number of raised portions forming a decorative border or letters spelling out the word "WELCOME" or similar greeting wherein one of the letters is provided with a flap that is sealable into a closed position covering an opening into a cavity sized to receive a key for a door lock.

2. Description of Related Art

U.S. Pat. No. 3,390,414 to I. H. Kravitt shows a door mat having a hinged portion to facilitate the wiping of a user's shoe sides.

The door or shoe mat shown in U.S. Pat. No. 3,886,620 to H. Miller et al. discloses a mat with a combination of flexible and non-flexible projections formed in the mat surface to assist in cleaning one's shoes.

U.S. Pat. No. 5,293,660 to J. H. Park reveals a foot scrub mat with a replaceable center pad.

The motor vehicle floor mat shown in U.S. Pat. No. 5,919,540 to B. Bailey discloses a floor mat for a car with a replaceable insert.

SUMMARY OF THE INVENTION

The apparatus for hiding a door key of the present invention includes a door mat formed of either a rubber or plastic material or braided material such as hemp. The door mat is rectangularly shaped with raised portions formed on the top surface. Different embodiments are shown with these raised portions forming a decorative border, an esthetically pleasing pattern or a greeting, such as "WELCOME", as is commonly seen. A hidden compartment sized to receive a typical house key is formed in these raised portions that is accessible through a hook and loop type closure. When the hook and loop type closure is closed, the compartment and its contents remain hidden from view.

It is thus a principal object of the invention to provide a door mat having a number of raised letters on the mat one of which is provided with a compartment that is securable with a hook and loop fastener to seal the compartment and keep the key in a hidden position.

Another object of the present invention is to provide a door mat having a number of raised portions in an esthetically pleasing pattern on the mat one of which is provided with a compartment that is securable with a hook and loop fastener to seal the compartment and keep the key in a hidden position.

A further object of the present invention is to provide a door mat having a raised portions forming a decorative border on the mat which is provided with a compartment that is securable with a hook and loop fastener to seal the compartment and keep the key in a hidden position.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENTS

Figure 1:
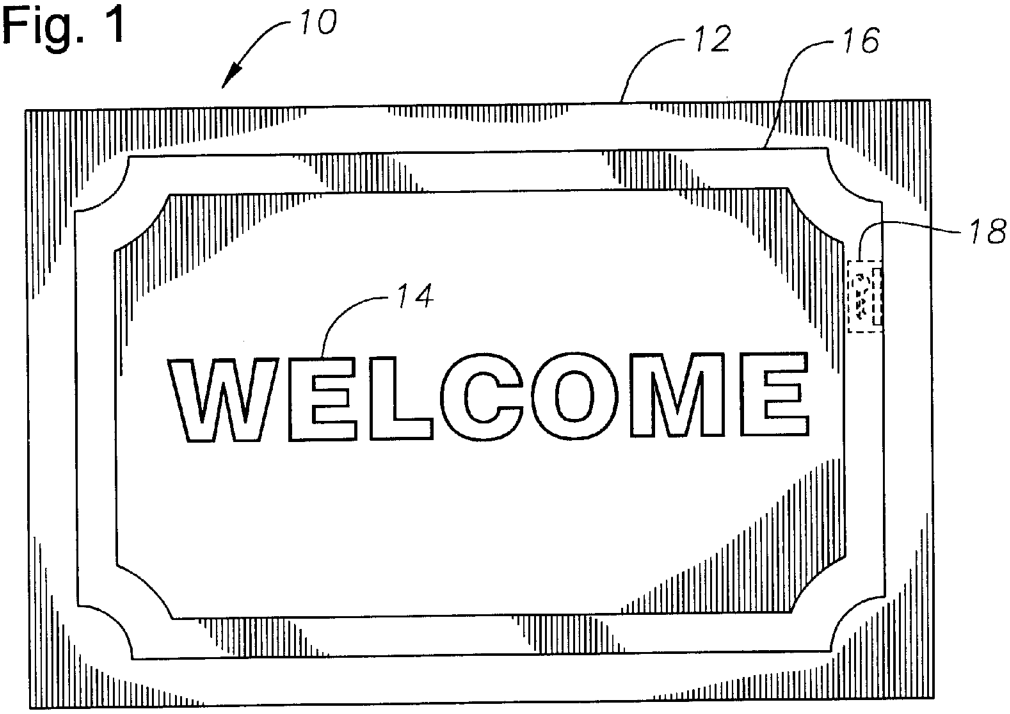
FIG. 1 is plan view of the present invention showing the position of the concealed compartment in the door mat.

With reference to the drawings, and particularly to FIG. 1, a plan view of the door mat 10 having a hidden compartment is shown. Door mat 10 includes generally planar base section 12 with raised portions forming greeting 14 in the form of letters to form the word "WELCOME" and decorative border 16. Base section 12, raised portions 14 and decorative border 16 may be molded as a unitary structure of a suitable material such as rubber or thermal set plastic or formed of a braided material, as rope or hemp, as is well known to those of ordinary skill in the art.

Figure 2:
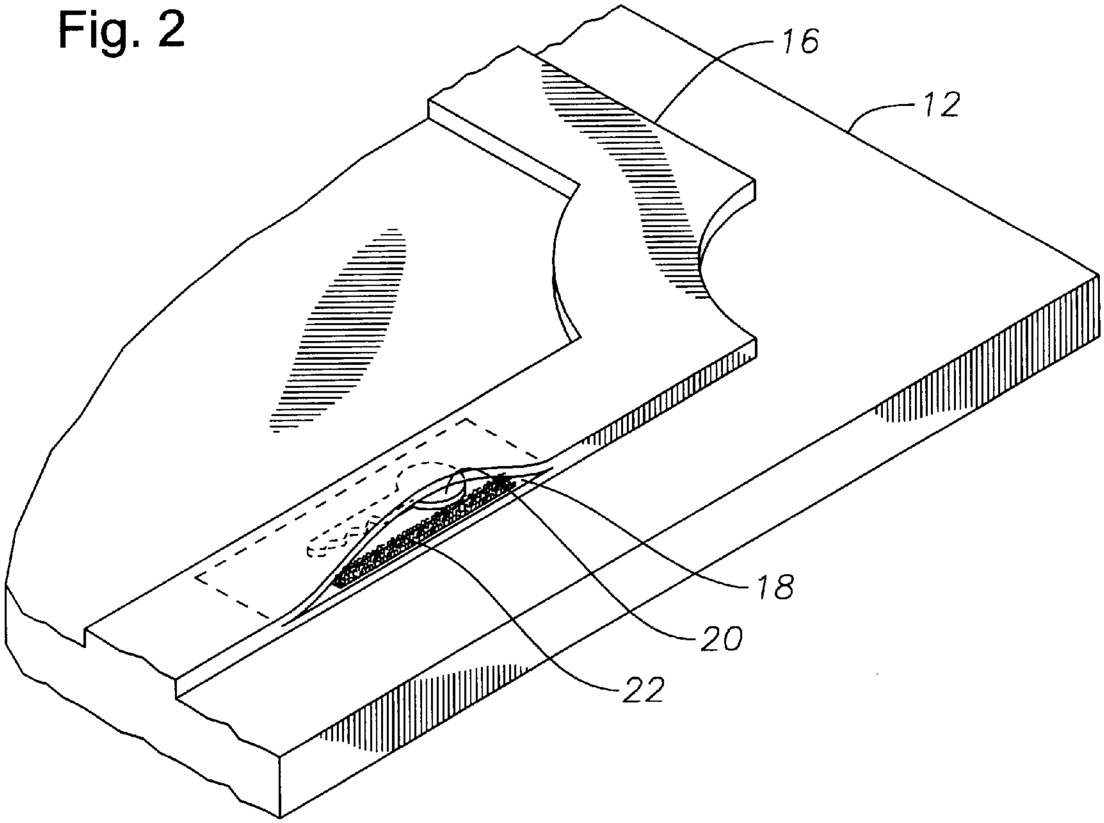
FIG. 2 is a perspective view of a section of the door mat showing the concealed compartment in an open position.

Compartment 18 is formed in decorative border 16 and is designed to be hidden from view when closed as shown in FIG. 1. As best seen in FIG. 2, hidden compartment 18 is sized to receive a typical house key 20 and is held closed by suitable closure means such as hook and loop fastener 22. Although shown with a hook and loop closure means, any suitable closure means allowing compartment 18 to blend in with decorative border 16 and remain hidden would be suitable and within the scope of the invention. Compartment 18 is shown being sized and containing a house key, but could also be used to hide money or other valuables without departing from the scope of the present invention.

Figure 3:
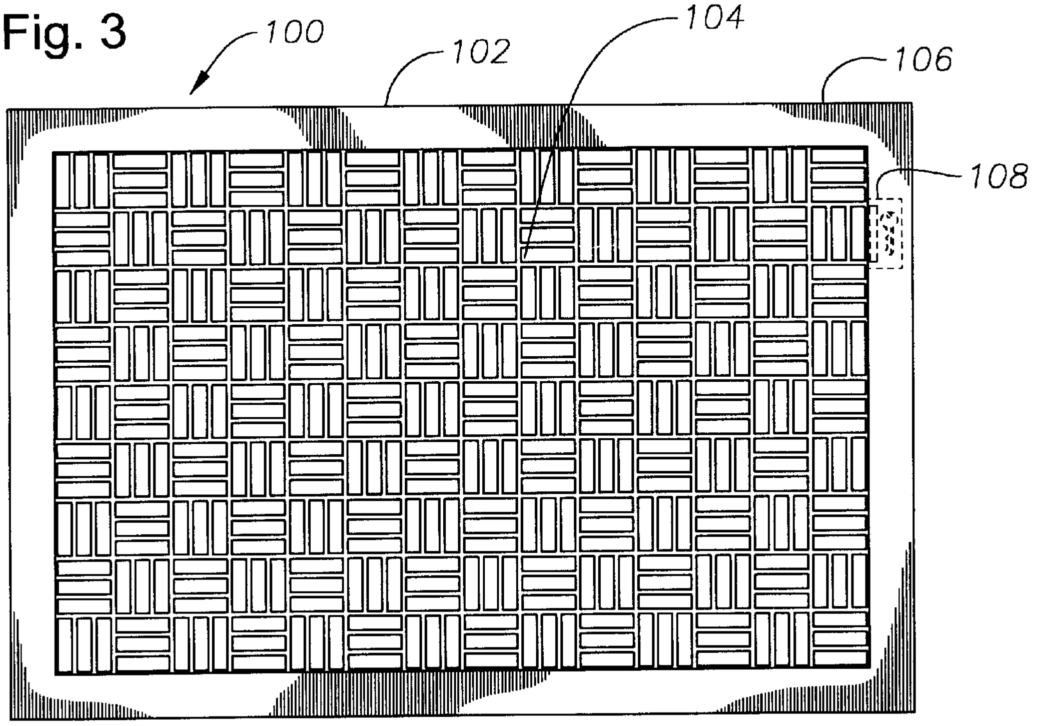
FIG. 3 is plan view of a second embodiment of the present invention showing the position of the concealed compartment.
Figure 4:
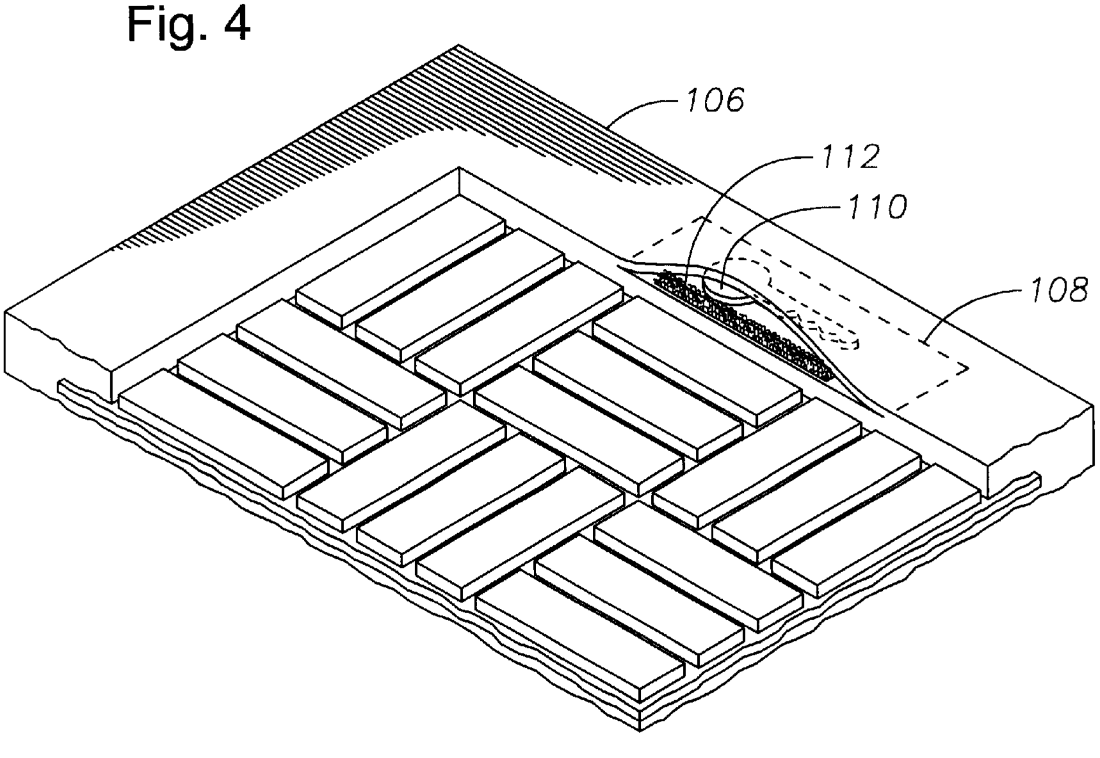
FIG. 4 is a perspective view of a section of the second embodiment showing the concealed compartment in an open position.

A second embodiment of the present invention is shown in FIGS. 3 and 4. With reference to FIG. 3, a plan view of a door mat 100 having a hidden compartment is shown. Door mat 100 includes generally planar base section 102 with raised portions forming esthetically pleasing pattern 104 in the interior with border 106 surrounding pattern 104. As in the first embodiment, base section 102, raised portions 104 and decorative border 106 may be molded as a unitary structure of a suitable material such as rubber or thermal set plastic or formed of a braided material, as rope or hemp, as is well known to those of ordinary skill in the art.

Compartment 108 is formed in decorative border 106 and is designed to be hidden from view when closed as shown in FIG. 3. As best seen in FIG. 4, hidden compartment 108 is sized to receive a typical house key 110 and is held closed by suitable closure means such as hook and loop fastener 112. Although shown with a hook and loop closure means, any suitable closure means allowing compartment 108 to blend in with decorative border 106 and remain hidden would be suitable and within the scope of the invention. Compartment 108 is shown being sized and containing a house key, but could also be used to hide money or other valuables without departing from the scope of the present invention.

Figure 5:
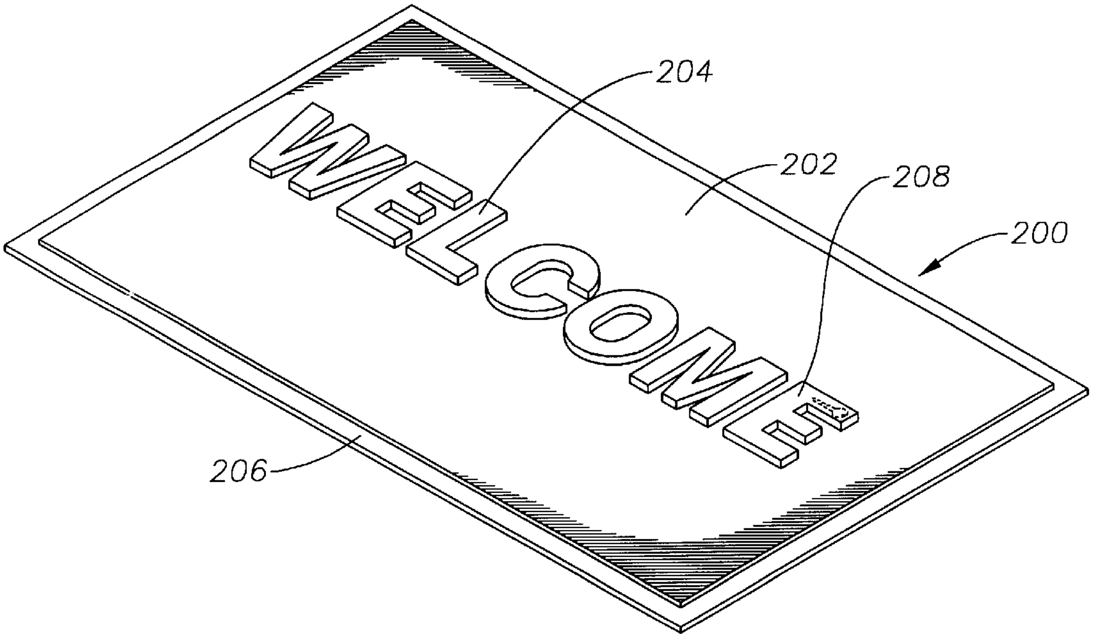
FIG. 5 is a perspective view of a third embodiment of the present invention showing the position of the concealed compartment in the raised letters of the door mat.
Figure 6:
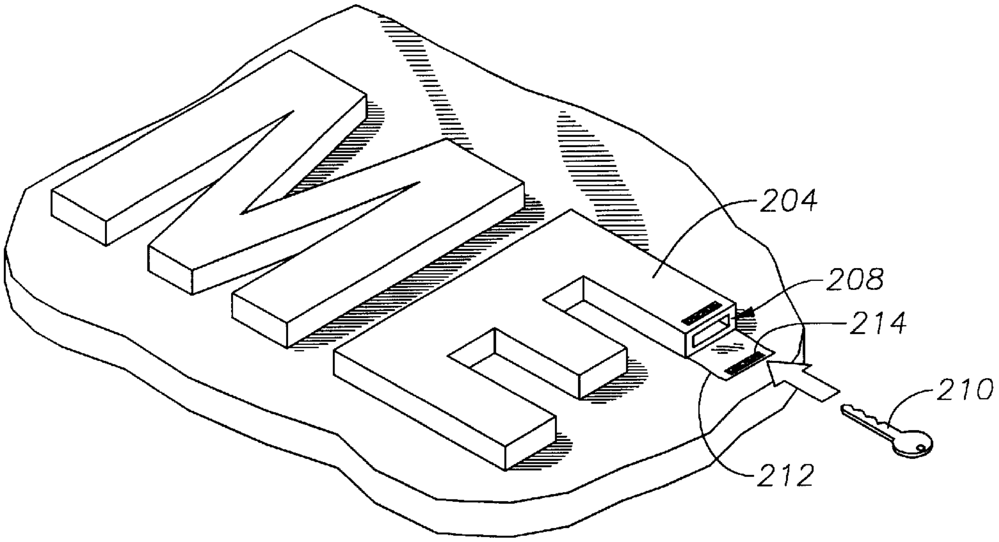
FIG. 6 is a perspective view of a section of the third embodiment showing the concealed compartment in an open position.

A third embodiment of the present invention is shown in FIGS. 5 and 6. With reference to FIG. 5, a perspective view of a door mat 200 having a hidden compartment is shown. Door mat 200 includes generally planar base section 202 with raised portions forming greeting 204 in the form of letters to form the word "WELCOME" and border 206. As in the previous embodiments, base section 202, raised portions 204 and decorative border 206 may be molded as a unitary structure of a suitable material such as rubber or thermal set plastic or formed of a braided material, as rope or hemp, as is well known to those of ordinary skill in the art.

Compartment 208 is formed in the edge of the letter "E" in greeting 204 and is designed to be hidden from view when closed as shown in FIG. 5. As best seen in FIG. 6, hidden compartment 208 is sized to receive a typical house key 210 and is closed by flap 212 which is closed by suitable closure means such as hook and loop fastener 214. Although shown with a hook and loop closure means, any suitable closure means allowing compartment 208 and flap 212 to blend in with the letter "E" in greeting 204 and remain hidden would be suitable and within the scope of the invention. Compartment 208 is shown being sized and containing a house key, but could also be used to hide money or other valuables without departing from the scope of the present invention.

The construction of my door mat with a hidden compartment for hiding a house key will be readily understood from the foregoing description and it will be seen that I have provided a door mat that allows the concealment of a key or other valuables while minimizing the chance for detection. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A door mat having a hidden compartment, comprising:

a generally planar base section, said base section having a plurality of raised portions formed on one side;

a compartment positioned within one of said raised portions; and, said compartment having a closure means to secure said compartment's contents therein.

2. A door mat having a hidden compartment according to claim 1, wherein:

said compartment is hidden from view when said closure means is closed.

3. A door mat having a hidden compartment according to claim 2, wherein:

said closure means is a hook and loop fastener.

4. A door mat having a hidden compartment according to claim 3, wherein:

said base section includes a decorative border formed on said one side of said base section.

5. A door mat having a hidden compartment according to claim 4, wherein:

said compartment is sized to receive a door key.

6. A door mat having a hidden compartment, comprising:

a generally planar base section, said base section having a plurality of raised portions formed on one side;

said plurality of raised portions in the shape of letters to form a greeting on said door mat;

a compartment positioned within one of said plurality of raised portions in the form of letters; and, said compartment having a closure means to secure said compartment's contents therein.

7. A door mat having a hidden compartment according to claim 6, wherein:

said compartment is hidden from view when said closure means is closed.

8. A door mat having a hidden compartment according to claim 7, wherein:

said closure means is flap secured by a hook and loop fastener.

9. A door mat having a hidden compartment according to claim 8, wherein:

said base section includes a decorative border.

10. A door mat having a hidden compartment according to claim 9, wherein:

said compartment is sized to receive a door key.

* * * * *